US005134976A

United States Patent [19]

Towner et al.

[11] Patent Number: 5,134,976

[45] Date of Patent: Aug. 4, 1992

[54] INTERNAL COMBUSTION ENGINE

[75] Inventors: Stephen J. Towner, Libertyville; George L. Broughton, Zion, both of Ill.

[73] Assignee: Outboard Marine Corporation, Waukegan, Ill.

[21] Appl. No.: 710,070

[22] Filed: Jun. 4, 1991

[51] Int. Cl.[5] .......... B23P 13/00

[52] U.S. Cl. .......... 123/65 PE; 123/65 P; 123/65 A

[58] Field of Search .......... 123/65 P, 65 PE, 65 A, 123/668, 193 C, 193 CP, 193 CH

[56] References Cited

U.S. PATENT DOCUMENTS

| | | | |
|---|---|---|---|
| 4,050,244 | 9/1977 | Morikawa et al. | 60/282 |
| 4,216,745 | 8/1980 | Latter et al. | 123/668 |
| 4,218,992 | 8/1980 | Latsch et al. | 123/668 |
| 4,233,717 | 11/1980 | Noda et al. | 123/65 A |
| 4,328,770 | 5/1982 | Hale | 123/65 P |
| 4,337,734 | 7/1982 | Iio | 123/65 PE |
| 4,557,227 | 12/1985 | Woodard | 123/65 |
| 4,562,799 | 1/1986 | Woods et al. | 123/193 C |
| 4,643,140 | 2/1987 | Whipple | 123/65 PE |
| 4,776,303 | 10/1988 | Hundertmark | 123/41.84 |
| 4,796,572 | 1/1989 | Heydrich | 123/41.42 |
| 4,864,986 | 9/1989 | Bethel et al. | 123/193 P |

*Primary Examiner*—Andrew M. Dolinar
*Assistant Examiner*—M. Macy
*Attorney, Agent, or Firm*—Michael, Best & Friedrich

[57] ABSTRACT

An internal combustion engine comprising an engine block defining a cylinder bore and including an exhaust passage communicating with the cylinder bore, a cylinder liner which is housed in the cylinder bore and which includes an exhaust port communicating with the engine block exhaust passage, and structure on one of the engine block and the cylinder liner for permitting one of the engine block and the cylinder liner to expand adjacent the exhaust port.

23 Claims, 2 Drawing Sheets

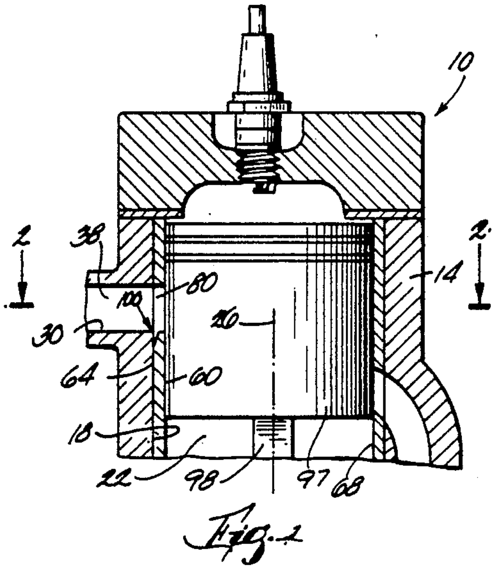
Fig. 1
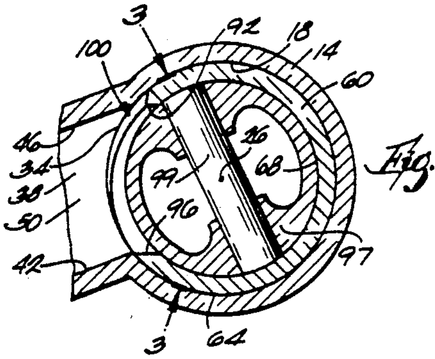
Fig. 2
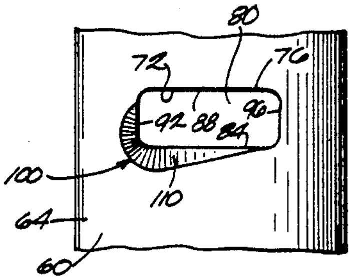
Fig. 3
Fig. 5
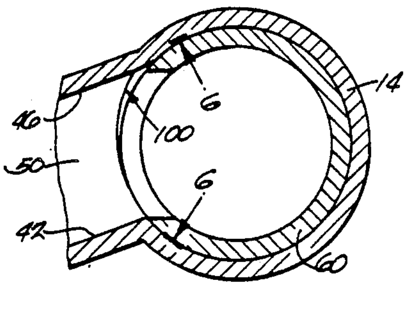
Fig. 8
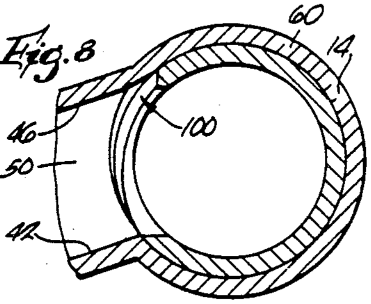
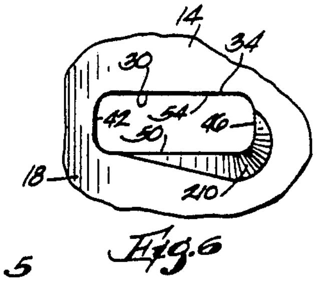
Fig. 6
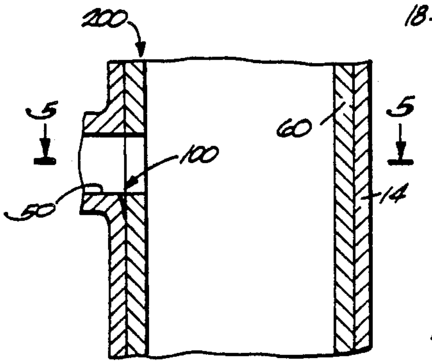
Fig. 4
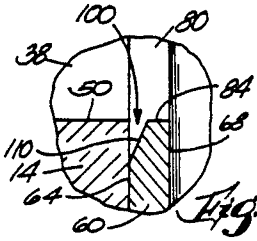
Fig. 9
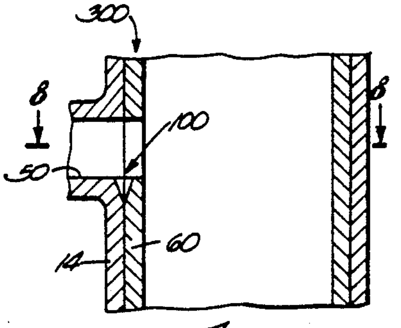
Fig. 7

INTERNAL COMBUSTION ENGINE

BACKGROUND OF THE INVENTION

The invention relates to internal combustion engines, and more particularly to two-stroke internal combustion engines.

The high temperatures at the exhaust port of a two-stroke engine can cause radially inward distortion of the cylinder sleeve, resulting in undesirable wear of the cylinder sleeve and/or the piston. One attempt to solve this problem is disclosed in U.S. Pat. No. 4,864,986, which teaches using an oval piston in order to accommodate thermal distortion of the cylinder bore.

Attention is also directed to the following U.S. Pat. Nos.:

| U.S. Pat. No. | Issue Date |
|---|---|
| 4,050,244 | September 27, 1977 |
| 4,216,745 | August 12, 1980 |
| 4,218,992 | August 26, 1980 |
| 4,562,799 | January 7, 1986 |
| 4,776,303 | October 11, 1988 |
| 4,796,572 | January 10, 1989 |

SUMMARY OF THE INVENTION

The invention provides an internal combustion engine comprising an engine block defining a cylinder bore and including an exhaust passage communicating with the cylinder bore, a cylinder liner which is housed in the cylinder bore and which includes an exhaust port communicating with the engine block exhaust passage, and means on one of the engine block and the cylinder liner for permitting one of the engine block and the cylinder liner to expand adjacent the exhaust port.

One embodiment of the invention provides an internal combustion engine comprising an engine block defining a cylinder bore and including an exhaust passage communicating with the cylinder bore, and a cylinder liner which is housed in the cylinder bore and which includes an exhaust port communicating with the engine block exhaust passage, the engine block and the cylinder liner defining therebetween a space adjacent the exhaust port.

One embodiment of the invention provides an internal combustion engine comprising an engine block defining a cylinder bore and including an exhaust passage communicating with the cylinder bore, a cylinder liner which is housed in the cylinder bore and which includes an exhaust port communicating with the engine block exhaust passage, a piston slidably housed by the cylinder liner, and means for substantially reducing wear between the piston and the cylinder liner adjacent the exhaust port.

One embodiment of the invention provides a cylinder sleeve for use in an internal combustion engine comprising an engine block defining a cylinder bore and including an exhaust passage communicating with the cylinder bore, the cylinder sleeve being adapted to be housed in the cylinder bore and comprising a generally cylindrical outer surface, a generally cylindrical inner surface, and an endless surface which extends between the inner and outer surfaces, which defines an exhaust port adapted to communicate with the engine block exhaust passage, and which meets the outer surface at an endless intersection, a portion of the intersection being chamfered so as to define a space adjacent the exhaust port and between the cylinder sleeve and the engine block when the cylinder sleeve is housed in the cylinder bore.

A principal feature of the invention is the provision of a relieved area adjacent the exhaust port on the cylinder sleeve and/or on the engine block in order to reduce wear between the piston and the cylinder sleeve.

Other features and advantages of the invention will become apparent to those of ordinary skill in the art upon review of the following detailed description, claims, and drawings.

DESCRIPTION OF THE DRAWINGS

FIG. 1 is a sectional view of an engine embodying the invention.

FIG. 2 is a view of the engine block and cylinder liner taken along line 2—2 in FIG. 1.

FIG. 3 is a view taken along line 3—3 in FIG. 2.

FIG. 4 is a sectional view of an alternative embodiment of the invention.

FIG. 5 is a view taken along line 5—5 in FIG. 4.

FIG. 6 is a view taken along line 6—6 in FIG. 5.

FIG. 7 is a view similar to FIG. 4 of a second alternative embodiment of the invention.

FIG. 8 is a view taken along line 8—8 in FIG. 7.

FIG. 9 is an enlarged portion of FIG. 1.

Figure 10:
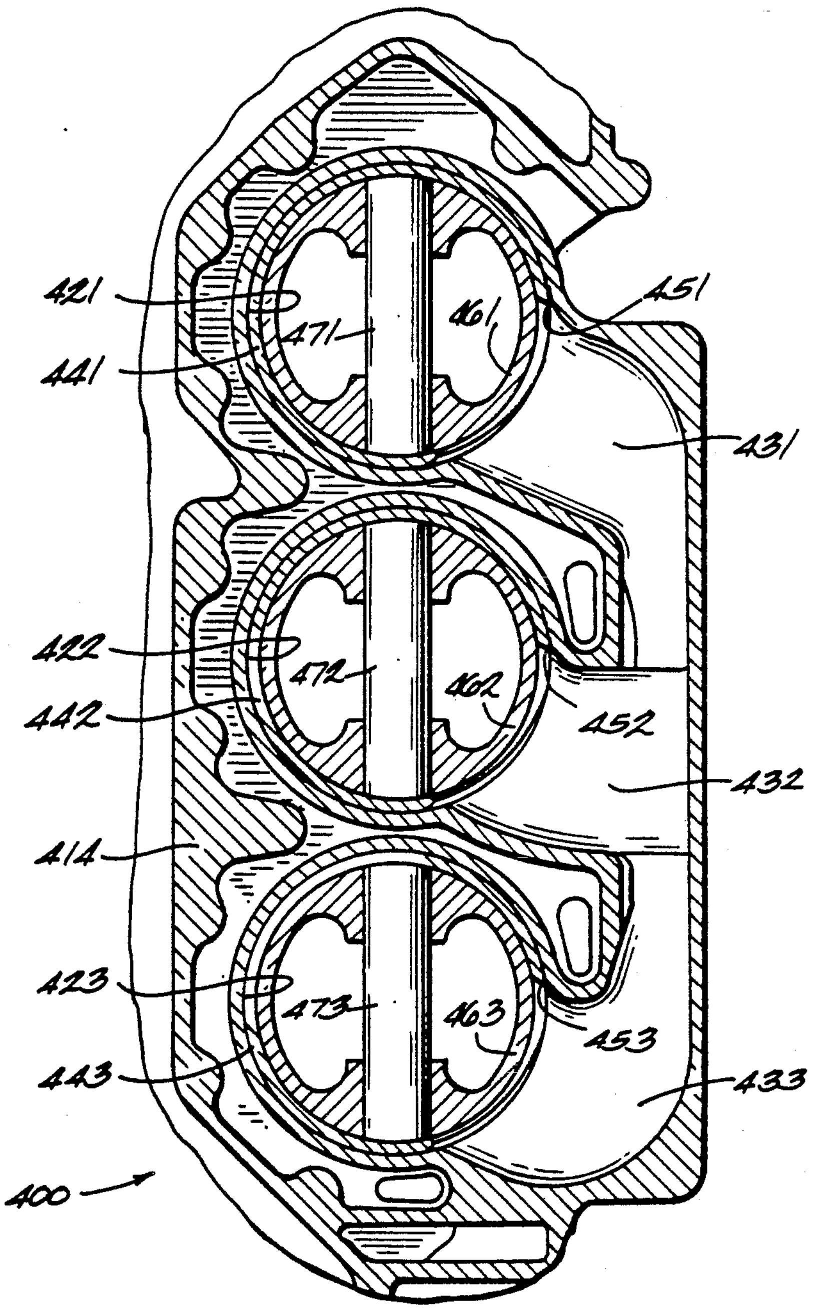
FIG. 10 is a sectional view of a third alternative embodiment of the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A two-stroke internal combustion engine 10 embodying the invention is illustrated in the drawings. While the illustrated engine is a simple one-cylinder engine, it should be understood that the invention is applicable to multiple-cylinder engines, such as V-6 engines.

The engine 10 comprises (see FIG. 1) an engine block 14 that is preferably made of aluminum. The engine block 14 includes a generally cylindrical inner surface 18 defining a cylinder bore 22 having a longitudinal axis 26. The engine block also includes an endless surface 30 which extends transversely to the inner surface 18, which meets the inner surface 18 at (see FIGS. 2 and 6) an endless intersection 34, and which defines an exhaust passage 38 communicating with the cylinder bore 22. As shown in FIG. 6, the endless surface 30 includes opposite side walls 42 and 46 spaced circumferentially of the cylinder bore 22. The endless surface 30 also includes a lower wall 50 extending between the side walls 42 and 46, and an upper wall 54 opposite the lower wall 50. As shown in FIG. 2, the exhaust passage 38 curves away from the cylinder bore 22 so that the side wall 46 partially faces the bore 22 and the side wall 42 faces away from the bore 22. In other words, the exhaust passage is, adjacent the cylinder bore 22, arcuate in a plane perpendicular to the axis 26 (e.g., the plane of FIG. 2).

The engine 10 also comprises (see FIG. 1) a cylinder sleeve or liner 60 housed in the cylinder bore 22. The cylinder liner 60 is preferably made of iron and includes (see FIG. 2) a generally cylindrical outer surface 64, a generally cylindrical inner surface 68, and (see FIG. 3) an endless surface 72 which extends between the inner and outer surfaces 68 and 64, which meets the outer surface 64 at an endless intersection 76, and which defines an exhaust port 80 communicating with the engine block exhaust passage 38. The endless surface 72 includes (see FIG. 3) a lower portion 84 defining a plane generally perpendicular to the axis 26 of the cylinder bore 22. The endless surface 72 also includes an upper portion 88 generally parallel to the lower portion 84, and opposite side portions 92 and 96 which are spaced circumferentially of the cylinder liner 60 and which extend between the upper and lower portions 88 and 84.

The engine 10 also comprises a crankshaft (not shown) rotatably supported by the engine block 14, a piston 97 slidably housed by the cylinder liner 60, and means for causing rotation of the crankshaft in response to reciprocation of the piston 97. Such means preferably includes a piston rod 98 pivotally connected to the crankshaft, and a wrist pin 99 pivotally connecting the piston rod 98 to the piston 97.

Because the side wall 46 of the engine block 14 partially faces the cylinder bore 22 and the side wall 42 faces away from the bore 22, exhaust gases exiting the cylinder bore 22 impinge on the side wall 46 more than on the side wall 42. This causes the area of the engine block 14 adjacent the side wall 46 to be heated more than the area of the engine block 14 adjacent the side wall 42. Furthermore, perhaps because the flow of cooling liquid (not shown) through the engine block 14 may not be uniform, the area of the engine block 14 adjacent the lower wall 50 tends to be heated more than the area adjacent the upper wall 54. The end result is that the area of the engine block 14 adjacent the intersection of the side wall 46 and the lower wall 50 is heated most. This heating can cause undesirable thermal expansion of the engine block 14, which can in turn cause undesirable radially inward distortion of the cylinder liner 60.

As shown in FIG. 2, the greatest mass of the piston 97 is in the two diametrically opposed areas where the wrist pin 99 is connected to the piston 97. One of these areas is located adjacent the exhaust port 80, and specifically adjacent the side wall 46 of the engine block 14. Because of the increased mass of the piston 97 at the pivotal connection to the wrist pin 99, the piston 97 in this area has less ability than other areas of the piston 97 to accommodate radially inward distortion of the cylinder sleeve 60. In fact, it is possible that the piston 97 in this area actually expands slightly when the piston 97 becomes hot.

The above-mentioned phenomena can, in the absence of preventive means such as described below, cause undesirable wear between the cylinder liner 60 and the piston 97 adjacent the exhaust port 80, and particularly adjacent the intersection of the walls 46 and 50. The engine 10 therefore further comprises means on one of the engine block 14 and the cylinder liner 60 for permitting either the engine block 14 or the cylinder liner 60 to expand adjacent the exhaust port 80, thereby substantially reducing wear between the piston 97 and the cylinder liner 60 adjacent the exhaust port 80. While various suitable means can be used, in the illustrated construction, such means includes (see FIGS. 1-3) a relieved area or space 100 defined between the engine block 14 and the cylinder liner 60. The space 100 communicates with or is open to the exhaust port 80 and has its maximum dimension adjacent the walls 46 and 50. In the illustrated construction, the cylinder liner 60 is chamfered to provide the space 100. More particularly, the portion of the intersection 76 where the side portion 92 and the lower portion 84 meet the outer surface 64 is chamfered to provide the space 100. The space 100 therefore extends from the side portion 96 to the side portion 92 and also beyond the side portion 92 circumferentially of the cylinder bore 22 (to the left in FIG. 3). Furthermore, the space 100 extends from the top portion 88 to the lower portion 84 and also beneath the lower portion 84 axially of the bore 22 (vertically in FIG. 3). Also, the width of the space 100 radially of the bore 22 (horizontally in FIG. 9) decreases in the direction away from the exhaust port 80 (from top to bottom in FIG. 9). It has been found that a gradual blending of the relieved area or space 100 with the exhaust port 80 facilitates manufacturing and improves performance. Therefore, the depth of the space 100 axially of the cylinder bore 22 (vertically in FIGS. 1 and 3) increases in the direction from the side portion 96 to the side portion 92 (from right to left in FIG. 3), and the width of the space 100 circumferentially of the cylinder bore 22 (horizontally in FIG. 3) increases in the direction from the upper portion 88 to the lower portion 84 (from top to bottom in FIG. 3).

Alternatively stated, the chamfer provides the cylinder liner 60 with (see FIGS. 3 and 9) an additional surface 110 extending between the surface portions 84 and 92 and the surface 64. The space 100 is defined between the surface 110 and the inner surface 18 of the engine block 14. Furthermore, as seen in FIG. 2, the radial extent of the surface portion 84 decreases in the direction from the surface portion 96 to the surface portion 92. Also, the radial extent of the surface portion 92 decreases in the direction from the upper surface portion 88 to the lower surface portion 84 (from top to bottom in FIG. 3).

An engine 200 that is an alternative embodiment of the invention is illustrated in FIGS. 4—6. Except as described below, the engine 200 is substantially identical to the engine 10, and common elements have been given the same reference numerals.

In the engine 200, the engine block 14 is chamfered to provide the space 100. More particularly, the portion of the intersection 34 where the side wall 46 and the lower wall 50 meet the inner surface 18 is chamfered to provide the space 100. As shown in FIG. 6, the chamfer on the engine block 14 of the engine 200 is a mirror image of the chamfer on the cylinder sleeve 60 of the engine 10. Thus, the chamfer on the engine block 14 provides the engine block 14 with an additional surface 210 (FIG. 6) that is a mirror image of the surface 110 of the engine 10.

An engine 300 that is a second alternative embodiment of the invention is illustrated in FIGS. 7 and 8. Except as described below, the engine 300 is substantially identical to the engine 10, and common elements have been given the same reference numerals.

In the engine 300, both the engine block 14 and the cylinder liner 60 are chamfered to provide the space 100. More particularly, the cylinder liner 60 of the engine 300 is identical to the cylinder liner 60 of the engine 10, and the engine block 14 of the engine 300 is identical to the engine block 14 of the engine 200.

An engine 400 that is a third alternative embodiment of the invention is illustrated in FIG. 10. Except as described below, the engine 400 is identical to the engine disclosed in U.S. Ser. No. 315,900, which was filed Feb. 27, 1989 and which is incorporated herein by reference. The engine 400 is a V-6 engine including two banks of three cylinders. Only one cylinder bank is illustrated in FIG. 10.

The engine 400 includes an engine block 414 defining first, second and third cylinder bores 421, 422 and 423, respectively, and first, second and third exhaust passages 431, 432 and 433 respectively communicating with the cylinder bores 421, 422 and 423. The engine 400 also includes first, second and third cylinder liners 441, 442 and 443 respectively housed in the cylinder bores 421, 422 and 423. The cylinder liners 441, 442 and 443 have therein respective exhaust ports 451, 452 and 453 respectively communicating with the exhaust passages 431, 432 and 433. The engine 400 also comprises first, second and third pistons 461, 462 and 463 respectively housed in the cylinder liners 441, 442 and 443 and pivotally connected to respective wrist pins 471, 472 and 473. As shown in FIG. 10, each of the cylinder liners 441, 442 and 443 is identical to the cylinder liner 60 of the engine 10.

Various features of the invention are set forth in the following claims.

We claim:

1. An internal combustion engine comprising an engine block defining a cylinder bore and including a passage communicating with said cylinder bore, a cylinder liner which is housed in said cylinder bore and which includes a port communicating with said engine block passage, and means on one of said engine block and said cylinder liner for permitting one of said engine block and said cylinder liner to expand outwardly adjacent said port.

2. An internal combustion engine comprising an engine block defining a cylinder bore and including a passage communicating with said cylinder bore, a cylinder liner which is housed in said cylinder bore and which includes a port communicating with said engine block passage, and means on one of said engine block and said cylinder liner defining therebetween a space adjacent said port for permitting one of said engine block and said cylinder liner to expand adjacent said port.

3. An engine as set forth in claim 2 wherein the width of said space radially of said cylinder bore decreases in the direction away from said port.

4. An engine as set forth in claim 2 wherein said space communicates with said port.

5. An engine as set forth in claim 2 wherein said space is defined in part by a chamfer on one of said engine block and said cylinder liner.

6. An engine as set forth in claim 5 wherein said cylinder liner includes a generally cylindrical outer surface, a generally cylindrical inner surface, and an endless surface which extends between said inner and outer surfaces, which meets said outer surface at an endless intersection, and which defines said cylinder liner port, and wherein a portion of said intersection is chamfered to define said space.

7. An engine as set forth in claim 5 wherein said engine block includes a generally cylindrical inner surface defining said cylinder bore, and an endless surface which extends transversely to said inner surface, which meets said inner surface at an endless intersection, and which defines said passage, and wherein a portion of said intersection is chamfered to define said space.

8. An engine as set forth in claim 7 wherein said cylinder liner includes a generally cylindrical outer surface and an endless surface which extends transversely to said outer surface, which meets said outer surface at a second endless intersection, and which defines said cylinder liner port, and wherein a portion of said second intersection is also chamfered to define said space.

9. An engine as set forth in claim 6 wherein said cylinder bore has a longitudinal axis, and wherein said endless surface includes a lower portion defining a plane generally perpendicular to the axis of said cylinder bore and meeting said outer surface at said portion of said intersection.

10. An engine as set forth in claim 9 wherein said endless surface also includes opposite side portions spaced circumferentially of said cylinder liner, and wherein the depth of said space axially of said cylinder bore increases in the direction from one of said side portions to the other of said side portions.

11. An engine as set forth in claim 10 wherein said space extends beyond said other of said side portions circumferentially of said cylinder bore.

12. An engine as set forth in claim 11 wherein said other of said side portions also meets said outer surface at said portion of said intersection.

13. An engine as set forth in claim 12 wherein said endless surface also includes an upper portion generally parallel to said lower portion, and wherein the width of said space circumferentially of said cylinder bore increases in the direction from said upper portion to said lower portion.

14. An engine as set forth in claim 9 wherein said engine block includes a generally cylindrical inner surface defining said cylinder bore, and a side wall extending transversely to said inner surface and partially defining said passage, wherein said cylinder bore has a longitudinal axis, and wherein said passage is, adjacent said cylinder bore, arcuate in a plane generally perpendicular to the axis of said cylinder bore so that said side wall partially faces said cylinder bore.

15. An internal combustion engine comprising an engine block defining a cylinder bore and including a passage communicating with said cylinder bore, a cylinder liner which is housed in said cylinder bore and which includes a port communicating with said engine block passage, and means on one of said engine block and said cylinder liner for permitting expansion of said engine block adjacent said engine block passage.

16. An engine as set forth in claim 2 and further comprising a piston slidably housed by said cylinder liner, a piston rod, and a wrist pin pivotally connecting said piston rod to said piston.

17. An engine as set forth in claim 16 wherein said cylinder liner includes a generally cylindrical outer surface, a generally cylindrical inner surface, and an endless surface which extends between said inner and outer surfaces, and which defines said cylinder liner port, wherein said endless surface includes opposite side portions spaced circumferentially of said cylinder liner, wherein one of said side portions is located adjacent the connection of said wrist pin and said piston, and wherein said space has a maximum dimension adjacent said one of said side portions.

18. An internal combustion engine comprising an engine block defining a cylinder bore and including an exhaust passage communicating with said cylinder bore, and a cylinder liner which is housed in said cylinder bore and which includes an exhaust port communicating with said engine block exhaust passage, said engine block and said cylinder liner defining therebetween a space adjacent said exhaust port.

19. An engine as set forth in claim 18 and further comprising a piston slidably housed by said cylinder liner, a piston rod, and a wrist pin pivotally connecting said piston rod to said piston.

20. An engine as set forth in claim 19 wherein said cylinder liner includes a generally cylindrical outer surface, a generally cylindrical inner surface, and an endless surface which extends between said inner and outer surfaces and which includes opposite side portions spaced circumferentially of said cylinder liner, wherein one of said side portions is located adjacent the connection of said wrist pin and said piston, and wherein said space has a maximum dimension adjacent said one of said side portions.

21. An internal combustion engine comprising an engine block defining a cylinder bore and including an exhaust passage communicating with said cylinder bore, a cylinder liner which is housed in said cylinder bore and which includes an exhaust port communicating with said engine block exhaust passage, a piston slidably housed by said cylinder liner, and means located between said liner and said block for substantially reducing wear between said piston and said cylinder liner adjacent said exhaust port.

22. An engine as set forth in claim 21 wherein said engine block and said cylinder liner define therebetween a space adjacent said exhaust port, and wherein said means includes said space.

23. A cylinder sleeve for use in an internal combustion engine comprising an engine block defining a cylinder bore and including an exhaust passage communicating with the cylinder bore, said cylinder sleeve being adapted to be housed in the cylinder bore and comprising a generally cylindrical outer surface, a generally cylindrical inner surface, and an endless surface which extends between said inner and outer surfaces, which defines an exhaust port adapted to communicate with the engine block exhaust passage, and which meets said outer surface at an endless intersection, a portion of said intersection being chamfered so as to define a space adjacent said exhaust port and between said cylinder sleeve and the engine block when said cylinder sleeve is housed in the cylinder bore.

* * * * *